Jan. 21, 1969   M. C. E. HENRION   3,423,066
VALVE WITH CIRCULAR BUTTERFLY VALVE MEMBER
Filed Feb. 8, 1966
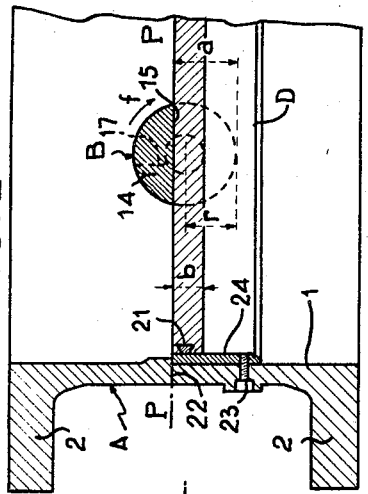
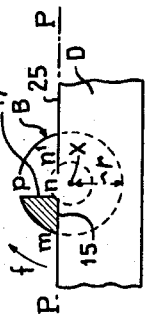
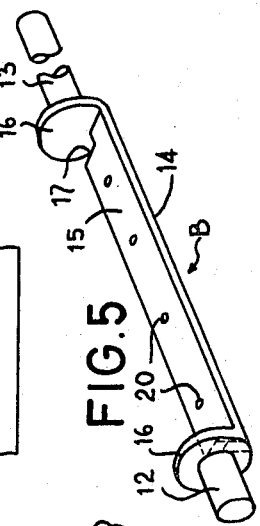
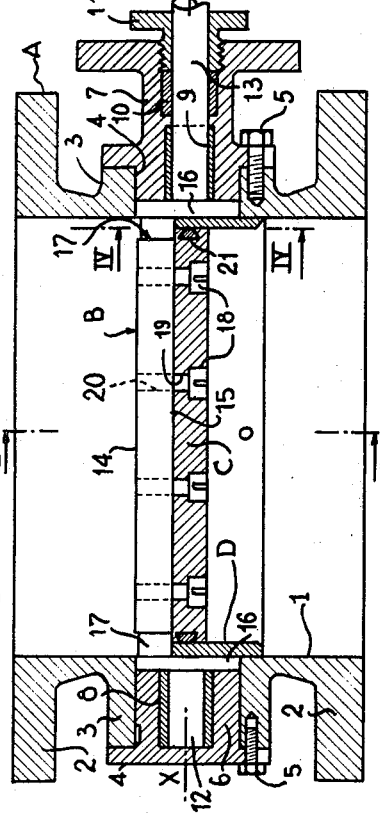
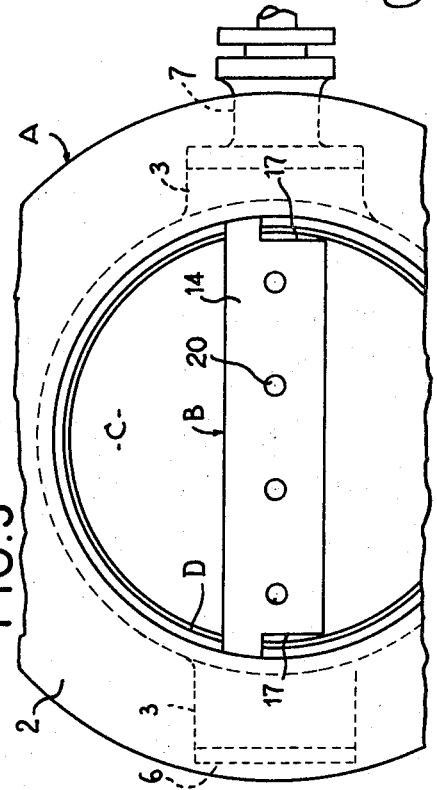
INVENTOR.
MARIE C. H. HENRION
BY United States Patent Office 3,423,066
Patented Jan. 21, 1969

3,423,066
VALVE WITH CIRCULAR BUTTERFLY VALVE MEMBER
Marie Charles Emile Henrion, 11 Rue Hermite, Nancy, France
Filed Feb. 8, 1966, Ser. No. 525,872
Claims priority, application France, Feb. 18, 1965, 6,035
U.S. Cl. 251—308   10 Claims
Int. Cl. F16k 5/04

ABSTRACT OF THE DISCLOSURE

A valve includes a body, a spindle rotatably mounted in the body and a butterfly valve member mounted on the spindle and having a fluid-tight lining seated in a groove around its periphery. The lining cooperates with a sleeve seated in the valve body to assure a fluid-tight closing of the valve. The spindle has a cylindrical body portion formed with a recess which is substantially rectangular in an axial section of the spindle and has a base lying in a chordal plane of the cylindrical body portion. The butterfly valve member is seated in this recess. Notches are provided at each end of the recess to cooperate with the sleeve in limiting movement of the valve to 90° between fully opened and fully closed positions.

Summary of the invention

My invention relates to valves which close fluid-tightly and in which is provided a circular butterfly valve member having, on its periphery, a toric joint member, for example of neoprene, which, in the closed position, comes into contact with the internal surface of a sleeve inserted in the valve body in the contact zone of the valve member.

In accordance with the invention, the valve includes a valve body having a spindle rotatably mounted therein. This spindle has a cylindrical body portion formed with a recess which is substantially rectangular in axial section of the spindle. The recess receives a butterfly valve member and has a depth, diametrically of the body portion of the cylinder, such that the axis of rotation of the spindle coincides with the median plane of the valve member. A sleeve is mounted in the valve body and extends to the base of the recess, which base lies in a chordal plane of the cylindrical body portion. Notches are formed at each end of the recess, extending into the base thereof, and cooperate with the sleeve to limit opening movement of the valve to 90°, closing movement of the valve being limited by engagement of the recess base with an end of the sleeve.

Brief description of the drawings

For an understanding of the principles of the invention, reference is made to the following description of a typical embodiment thereof as illustrated in the accompany drawings.

In the drawings:

FIG. 1 is an axial and diametric sectional view through a valve embodying the invention;

FIG. 2 is a partial sectional view, taken on the line II—II of FIG. 1;

FIG. 3 is a partial plan view of the valve in the closed position;

FIG. 4 is a partial sectional view, taken on the line IV—IV of FIG. 1 and illustrating one of the movement limiting notches of the spindle; and FIG. 5 is a perspective view of the valve spindle.

Description of the preferred embodiment

Referring to the drawing, the valve comprises a body A, a spindle B rotatably mounted in the body A on a transverse axis X—X thereof, a butterfly valve member C secured to the spindle and rotatable through 90° between the closed position illustrated and a fully open position, and a sleeve D which reduces the internal cross section of the body and co-operates with the periphery of the valve member to ensure fluid-tightness of the closed valve.

The body A has a pair of flanges 2, for securing the valve between two pipe elements and an internal surface 1 arranged to extend between the internal surfaces of the pipe elements. Provided on the outer surface of the body, and co-axial with the spindle axis X—X, are two diametrically opposite bosses 3, each having a cylindrical bore 4 in which is secured, by means of a screw 5 or the like, one of two detachable bearing block members 6 and 7.

The body of bearing block 6 is formed with an inwardly opening blind cylindrical recess receiving a lining sleeve 8 which is preferably of anti-friction material. The body of bearing block 7 is formed with an inner cylindrical bore receiving a lining sleeve 9, likewise of anti-friction material, and a larger diameter outer bore receiving a fluid-tight lining 10 which may be compressed by a packing screw 11 threaded into the outer end of bearing block 7. Sleeves 8 and 9 assure that a spindle B, which is borne therein, pivots or rotates with minimum friction. Spindle B has a journal 12, at one end, received in lining sleeve 8 and, at the opposite end, spindle B has a relatively longer journal 13 which extends through sleeve 9, packing 10 and screw 11, journal 13 projecting beyond screw 11 for connection to suitable driving means which have not been illustrated.

The central portion of spindle B comprises a cylindrical body 14 which is provided, over nearly all its length with a recess 15 which terminates adjacent each end of body 14 in a circular flange 16. Recess 15 comprises a flat chordal base, so that the axial section of this recess passing through axis X—X, is of rectangular form. Its depth $a$ is larger than the radius $r$ of the spindle body 14. Body 14 of spindle B is formed with a pair of notches 17, one at each end of rectangular recess 15. Each notch 17 opens through the base of recess 15 and includes an inner edge which is perpendicular to this base and extends, parallel to a radius of body 14, from the base of recess 15 outwardly to the cylindrical periphery of body 14, as best seen in FIGS. 1, 3 and 4. Each notch 17, as best seen in FIG. 4, has the contour of a truncated circular segment so that the remaining portion of the circular segment, formed by body 14, is reduced to a curvilinear isosceles triangle in which the lengths $m$–$n$ and $n$–$p$ are equal. Thereby, when spindle B is turned through 90° about axis X—X, in the direction of arrows $f$, the trace line $n$ describes a 90° arc $n$–$n^1$. This arc is situated completely above the plane P—P which, in the position of the parts shown in FIG. 4, includes the base of recess 15. The advantage of this arrangement will be apparent as the description proceeds.

Butterfly valve member C, which is preferably a plane circular plate, is secured in recess 15 of spindle B by means of screws 18 extending through unthreaded holes 19 of valve member C and threaded into threaded holes 20 of spindle B. The valve member C is preferably a circular disk cut from sheet metal, and it is flat and has a thickness $b$.

It will be observed that the distance $a$–$r$ (see FIG. 2) is equal to the half-thickness ($b/2$) of the valve member C. Owing to this equality, the axis X—X of the spindle is situated in the median plane of the valve member C.

The valve member has a peripheral groove, for example of trapezoidal section, containing a fluid tight lining or gasket 21, of neoprene or similar material, this lining being arranged to assure by its contact with sleeve D, the required fluid tightness in the closed position of the valve.

The sleeve D, of steel or similar material, is inserted by construction in the body A the internal surface 1 of which it fits exactly, without any play. It rests against an internal shoulder 22, provided on the surface 1, as shown in FIG. 2, and is fastened, for example, by screws 23 which pass through unthreaded holes in the body A and are screwed into threaded holes in the sleeve. Shoulder 22 and the corresponding holes in body 1 and in sleeve D are so positioned that the upper edge of sleeve D, as viewed in FIGS. 1 and 2, lies in the plane P—P which, in the closed position of the valve, with valve member C extending transversely of the valve body 1, includes the upper surface of valve member C, as viewed in FIGS. 1 and 2, and the base of recess 15 of spindle B.

The notches 17 are aligned with two diametrically opposite points of sleeve D, as will be apparent from FIG. 1, and the width of these notches, considered axially of spindle B, is greater than the radial thickness of sleeve D. It will be noted that the circular flanges 16 seat substantially flush in the inner surface of valve body 1, and that notches 17 have their axially outer edges, defined by the flanges 16, also substantially flush with the inner surface of body 1.

The operation is as follows. In the closed position of the valve, shown in FIGS. 1 and 2, the valve member C makes a fluid-tight contact, by means of its lining or gasket 21, with the internal cylindrical surface 24 of sleeve D.

In order to open the valve, the spindle is turned by means of a control device, not shown, which acts on spindle B, the maximum rotation of which is 90° about the axis X—X, in the direction of arrow $f$.

Owing to the fact that, on one hand, the axis X—X passes through the median plane of valve member C, this latter, in the course of its rotation, turns solely about the axis X—X and its external surface describes, therefore, a perfect circle which is internally tangential to surface 24 of the sleeve. There is therefore no sliding of the lining 21 in this sleeve, so that wear is reduced considerably, if not completely. On the other hand, the rotation of the whole unit, comprising the spindle B and valve member C, is not hindered by the fact that sleeve D extends to the plane P—P, as notches 17 engage, in the valve opened position, the top edge 25 of the sleeve D, line $n$ (FIG. 4) describing an arc $n$–$n^1$ above edge 25 of the sleeve. The rotation of the valve member therefore remains ideal while, at the same time, a sleeve extends sufficiently towards the top in FIGS. 1 and 2 to permit a perfect contact between this sleeve and lining 21 in the closed position of the valve.

Assembly and disassembly of the valve do not present any serious difficulty.

For assembly, spindle B is inserted through one of the diametrically opposite openings 4 in body 1, to the position which it occupies in FIG. 1. The sleeve D is then inserted by force and rests against shoulder 22 of the gate valve body 1, being secured by screws 23 (FIG. 2). The valve member C is then fixed on to the spindle B by means of screws 18. Finally, the end bearing-blocks 6 and 7, previously provided with their respective sleeves 8 and 9, are put in place by engaging these latter on journals 12 and 13 of spindle B.

To disassemble the reverse is carried out.

Of course the invention is in no way restricted to the form of embodiment shown and described here, which is described by way of example.

What I claim is:

1. A valve comprising, in combination, a valve body; a spindle rotatably mounted in said body for rotation about an axis extending transversely of said body, said spindle having a substantially cylindrical body portion formed with a recess which, in axial section of said spindle, is substantially rectangular and includes a base lying in a chordal plane of said substantially cylindrical body portion; a butterfly valve member seated in said recess and secured to said spindle, the depth of said recess being such that the medial plane of said valve member includes said transverse axis; said valve member having an outwardly opening groove, extending around its periphery; a fluid-tight lining seated in said groove; a sleeve seated in said valve body and cooperable with said lining to assure a fluid-tight closing of said valve; and abutment means on said spindle engageable with an end edge of said sleeve in both the fully opened and fully closed positions of said valve member and limiting movement of said valve member to an angular displacement of substantially 90°.

2. A valve, as claimed in claim 1, in which the depth of said recess is in excess of the radius of said substantially cylindrical body portion of said spindle.

3. A valve, as claimed in claim 1, in which said cylindrical body portion is formed with a pair of notches, one at each end of said recess; each notch opening through said base of said recess and through the substantially cylindrical exterior surface of said substantially cylindrical body portion; the inner edge of each recess extending substantially parallel to a radius of said cylindrical body portion; said base of said recess constituting a first of said abutment means and the inner edges of said notches constituting a second of said abutment means; said sleeve extending into said notches and said base of said recess, in the closed position of said valve member, engaging said end edge of said sleeve; said inner edges of said notches engaging said end edge of said sleeve in the opened position of said valve member.

4. A valve, as claimed in claim 3, in which each of said notches has, in diametric section of said cylindrical body portion, the shape of a truncated circular segment.

5. A valve, as claimed in claim 4, in which the portions of said cylindrical body portion defining said inner edges of said notches have the shape of curvilinear isosceles triangles whose equal sides have a length less than the radius of said cylindrical body portion.

6. A valve, as claimed in claim 5, in which the apices of said curvilinear isosceles triangle, during a 90° displacement of said valve member, describe arcs situated completely above a plane including said base of said recess when in the closed position of said valve member.

7. A valve, as claimed in claim 1, in which said valve body is formed with an annular shoulder on its internal surface engaging said end edge of said sleeve and serving to locate said sleeve in said valve body.

8. A valve, as claimed in claim 1, in which said valve body is formed with a pair of apertures, one at each end of said transverse axis and coaxial therewith; and a pair of bearing members each seated in a respective one of said apertures and formed with a bore coaxial with said transverse axis; said spindle having a pair of journals, one at each end thereof, and each received in a respective bore.

9. A valve, as claimed in claim 8, including bearing liners, each inserted in one of said bores and embracing the associated journal.

10. A valve, as claimed in claim 8, in which each of said apertures has a diameter at least equal to the diameter of said substantially cylindrical portion of said spindle, whereby said spindle may be positioned in said valve body by insertion through one of said apertures, with said bearing members being then positioned over the respective journals and in the respective apertures.

References Cited

UNITED STATES PATENTS

| | | | |
|---|---|---|---|
| 2,853,267 | 9/1958 | Herren et al. | 251—308 X |
| 2,907,548 | 10/1959 | Maas et al. | 251—308 X |
| 2,978,222 | 4/1961 | Henrion | 251—306 X |

FOREIGN PATENTS

| | | |
|---|---|---|
| 970,530 | 9/1964 | Great Britain. |
| 209,857 | 1/1957 | Australia. |
| 1,255,873 | 1/1961 | France. |
| 613,700 | 5/1935 | Germany. |

M. CARY NELSON, *Primary Examiner.*

ROBERT C. MILLER, *Assistant Examiner.*